United States Patent

Buchanan et al.

[11] 4,297,584
[45] Oct. 27, 1981

[54] RARE EARTH PHOSPHORS AND PHOSPHOR SCREENS

[75] Inventors: Robert A. Buchanan, Palo Alto; T. Grant Maple; Alden F. Sklensky, both of Sunnyvale, all of Calif.

[73] Assignee: Lockheed Missiles & Space Company, Inc., Sunnyvale, Calif.

[21] Appl. No.: 786,227

[22] Filed: Apr. 11, 1977

[51] Int. Cl.³ .................................................. G01J 1/58
[52] U.S. Cl. ................................. 250/483; 250/486; 252/301.4 H
[58] Field of Search .......................... 250/483, 486; 252/301.4 H

[56] References Cited

U.S. PATENT DOCUMENTS

| | | | |
|---|---|---|---|
| 3,591,516 | 7/1971 | Rabatin | 252/301.4 X |
| 3,617,743 | 11/1971 | Rabatin | 250/483 |
| 3,829,700 | 8/1974 | Buchanan | 250/483 |
| 3,872,309 | 3/1975 | De Belder et al. | 250/483 |
| 3,891,852 | 6/1975 | Bollen et al. | 250/483 |
| 4,054,798 | 10/1977 | Watanabe | 250/483 |

FOREIGN PATENT DOCUMENTS

| | | | |
|---|---|---|---|
| 492722 | 9/1938 | United Kingdom | 252/301.4 H |
| 607910 | 9/1948 | United Kingdom | 252/301.4 H |

OTHER PUBLICATIONS

Fluorescent & Other Gaseous Discharge Lamp by Forsythe et al., Murray Hill Books (1949), pp. 47–50.

Primary Examiner—Harold A. Dixon
Attorney, Agent, or Firm—Richard H. Bryer

[57] ABSTRACT

This invention relates to rare earth phosphor screens for converting image carrying incident radiation to image carrying visible or near-visible radiation and to the rare earth phosphor materials utilized in such screens. The invention further relates to methods for converting image carrying charged particles to image carrying radiation principally in the blue and near-ultraviolet region of the spectrum and to stabilized rare earth phosphors characterized by having a continuous surface layer of the phosphors of the invention. More particularly, the phosphors of the invention are oxychlorides and oxybromides of yttrium, lanthanum and gadolinium activated with trivalent cerium and the conversion screens are of the type illustratively including x-ray conversion screens, image amplifier tube screens, neutron imaging screens, cathode ray tube screens, high energy gamma ray screens, scintillation detector screens and screens for real-time translation of image carrying high energy radiation to image carrying visible or near-visible radiation.

33 Claims, 8 Drawing Figures

Fig. 6

RARE EARTH PHOSPHORS AND PHOSPHOR SCREENS

BACKGROUND OF THE INVENTION

The invention described herein was made in the course of, or under, Contract No. AT(04-3)-836 with the United States Atomic Energy Commission.

As is now conventional in the art, phosphor screens are utilized to convert image carrying incident radiation to image carrying visible or near-visible radiation. Such screens illustratively include x-ray conversion screens, image amplifier tube screens, neutron imaging screens, cathode ray tube screens and high energy gamma ray screens. The key constituent of such screens is a phosphor material which absorbs incident photons and produces in their stead photons of visible or near-visible energy. To be useful in such screens, the phosphor material must stop the incident photons effectively and must convert efficiently the absorbed photons into visible or near-visible radiation. Thus, the ideal phosphor material should have both a high absorption coefficient for the incident radiation and a high conversion efficiency.

To date, only a few phosphors out of the thousands available to the art are generally utilized in x-ray conversion screens: calcium tungstate ($CaWO_4$); cadmium-zinc sulfide powders, typically ($Cd_{0.5}Zn_{0.5}$)S:Ag; cesium iodide (CsI); and barium strontium sulfate:europium $(Ba,Sr)SO_4$:Eu. These phosphors, however, have serious disadvantages. Calcium tungstate, widely used in film intensifying screens, has a high x-ray absorption coefficient but its conversion efficiency is quite low, being typically only 3 percent. Cadmium-zinc sulfide powder, used in fluoroscopic screens and x-ray image intensifier tubes, has high conversion efficiency, typically about 20 percent, but its x-ray absorption coefficient is quite low over most of the x-ray energy range of interest. Recently, cesium iodide has been used in image intensifier tubes. However, this material has both an x-ray absorption coefficient and a conversion efficiency only intermediate to those of $CaWO_4$ and $(Cd_{0.5}Zn_{0.5})$S:Ag and accordingly suffers the same disadvantages as the aforesaid materials. This material is also hygroscopic and must be protected from the atmosphere. Although $(Ba,Sr)SO_4$:Eu has been claimed by Luckey (U.S. Pat. No. 3,650,976) to have twice the conversion efficiency of $BaSO_4$:Pb, the x-ray absorption coefficient is less than that of $CaWO_4$, and thus $(Ba,Sr)SO_4$:Eu is only marginally superior to $CaWO_4$.

Buchanan, et al. have shown in U.S. Pat. Nos. 3,829,700 and 3,725,704 that $La_2O_2S$:Tb, $Lu_2O_2S$:Tb and $Gd_2O_2S$:Tb are markedly superior to $CaWO_4$ because they combine high x-ray absorption coefficients and high energy conversion efficiency. Masi has also shown in U.S. Pat. No. 3,738,856 that $Y_2O_2S$:Tb has higher speed than $CaWO_4$. These oxysulfide phosphors have, however, the green emission characteristic of the terbium activator, necessitating the use of special green-sensitized photographic film for optimum results. For terbium concentrations less than 1 percent, the emission is bluish-green, permitting use of blue-sensitive photographic film but at the cost of loss of efficiency.

$Gd_2O_2S$:Tb also has valuable properties as a phosphor for neutron screens by reason of its high energy conversion efficiency and exceptionally great neutron absorption coefficient due to the presence of gadolinium. The $_{64}Gd^{157}$ isotope has the largest known neutron absorption coefficient and $Gd_2O_2S$:Tb has exceptional sensitivity for the detection of thermal neutrons.

For industrial radiographic applications in which the specimen to be examined has substantial thickness, x-ray or gamma ray energies in the range of about 100 Kev to 30 MeV are employed. Takizawa, et al. have described in U.S. Pat. No. 3,389,255 a conversion screen for the imaging of high energy radiation which comprises a fluorescent material, typically $CaWO_4$, $BaSO_4$:Pb, ZnS:Ag or KI:Tl, coated on a metal substrate, for example, lead or lead alloy foil. These screens, however, suffer several disadvantages in terms of the amount of incident x-rays the screens can absorb and the brightness of the resulting image which detract from the screens usefulness. In U.S. Pat. No. 3,872,309, de Belder has described an improved radiographic screen consisting of yttrium, lanthanum, gadolinium or lutetium oxysulfide or oxyhalide activated with the rare earth metals Dy, Er, Eu, Ho, Nd, Pr, Sm, Tb, Tm or Yb and coated on a metallic substrate containing Ag, Sn, Te, Tl, W, Pt, Au, Hg, Ta or Pb. The majority of the named activators, however, produce phosphors of low emission intensity. Only Tm produces blue emission suitable for recording on ordinary photographic film, but the energy conversion efficiency for this activator is relatively low. The other named activators produce emission ranging from the green to the infrared, all of which require specially sensitized film. The most efficient oxysulfides are those activated with terbium. These phosphors, however, have a green emission necessitating the use of special green-sensitized photographic film for optimum results. The remaining oxysulfides are typically phosphors of low emission intensity which produce emission ranging from green to infrared. The most efficient of the oxyhalides is terbium-activated gadolinium which emits principally in the green region and suffers the disadvantage that it is unstable in the presence of atmospheric moisture undergoing marked reduction in energy conversion efficiency as a result.

Recently, Rabatin has described in a series of U.S. Pat. Nos. 3,591,517; 3,607,770; 3,617,743; 3,666,676; and 3,795,814, a group of rare earth oxyhalide phosphors, processes for producing them and x-ray image converters based on these materials. Rabatin's processes produce lanthanide oxyhalide phosphors of markedly superior energy conversion efficiency to that attained in earlier attempts to produce rare earth oxyhalide phosphors such as described by Blasse and Bril in "Investigations of $Tb^{3+}$-Activated Phosphors" in Philips Research Reports 22, 481–504, 1967. Many of the oxybromide and oxychloride phosphors of Rabatin exhibit energy conversion efficiencies approximating that of (Zn,Cd)S:Ag, with the advantage of higher x-ray absorption coefficients than the latter. These phosphors, however, emit principally in the green region necessitating the use of special green-sensitized film for optimum results.

Rabatin's oxybromides also exhibit considerable instability when exposed to air. As reported by Rabatin, "Although the phosphors are relatively stable in dry air, they are readily decomposed by hot water and at elevated temperature due to the action of moisture." (The Electrochem. Soc. Extended Abstracts, Spring Meeting 1969, Abstract No. 78). Barnighausen, Brauer and Schultz, who were the first to prepare SmOBr, EuOBr and YbOBr (Z. anorg. allgem. Chem. 338, 250, 1965) had previously noted a marked tendency of these compounds to take up moisture from the air. This instability toward moisture appears to be a general characteristic of rare earth oxybromides. We have found that yttrium, lanthanum and gadolinium oxybromide phosphors prepared according to the methods of Rabatin undergo a reaction with ordinary room air such that a visible change is evident after only a few days exposure. Thus, pressed powder compacts of the oxybromide phosphors were observed to visibly swell and decrepitate, in much the same manner as is known for $La_2O_3$, except that hydrobromic acid appeared to be a product of the reaction of the oxybromides with room air. A gradual decrease in cathodoluminescent brightness of the oxybromides under continuing electron excitation was also observed at moderate current densities. Thus, when excited in a vacuum with 10 Kev electrons at a density of 100 nanoamperes per $cm^2$, the brightness decreased to 80 percent of its initial value within 60 minutes. The instability of the oxybromides when exposed to room air or electron excitation and resultant reduction of energy conversion efficiency constitutes a serious disadvantage to the use of these phosphors.

In U.S. Pat. No. 3,666,676 Rabatin and Bradshaw disclosed that lanthanum and gadolinium oxychlorides and oxybromides activated with terbium exhibit a desirable reduced afterglow when ytterbium was also present. In U.S. Pat. No. 3,617,743 Rabatin disclosed that the presence of cerium produced a desirable sensitizing effect in terbium-activated lanthanum and gadolinium oxyhalides, and in particular the brightness of LaOBr:0.05Tb was significantly enhanced by the presence of about 0.6 mole percent of cerium, with best results being obtained with 15 mole percent terbium and 0.5 mole percent of cerium. However, the patent cautions that "This proven sensitization by cerium is not predictable. It occurs in varying degrees in lanthanum and gadolinium oxychlorides and oxybromides only when activated with terbium and not when activated by other rare earth elements including europium, samarium, holmium, dysprosium and thulium. The effect is greatest in lanthanum oxybromide." With increased amounts of cerium and decreased amounts of terbium, Rabatin found a decrease in brightness under 3650 A° excitation. Thus, LaOBr:0.05Tb, 0.05Ce had a brightness only 44 percent of that for LaOBr:0.15Tb, 0.005Ce. In addition, the emission spectrum is that of $Tb^{3+}$ and not $Ce^{3+}$. Clearly, cerium does not perform as an activator in the presence of terbium.

Instances of activation by cerium alone are known. Thus, a cerium-activated calcium-magnesium silicate phosphor is used as the P-16 cathode ray tube screen. Its low x-ray absorption coefficient renders it unsuitable for use in x-ray screens. Certain rare earth orthophosphates activated by cerium were disclosed by Struck in U.S. Pat. No. 3,104,226 to have exceptionally fast decay times. The energy conversion efficiencies of these phosphates under various types of incident excitation are, however, inferior to those of the best oxyhalides exemplified by Rabatin and the phosphors of the instant invention. Although Struck observed very fast decay time for his cerium-activated phosphates, other cerium-activated phosphors are known to have nonexponential decay curves which limit their usefulness. Thus, Bril, et al. (J. Electrochem. Soc. 117, 346, 1970) have reported the emission intensity of $Y_3Al_5O_{12}$:Ce to be 6 percent, of $Ca_2Al_2SiO_7$:Ce to be 9 percent, and of $YAl_3B_4O_{12}$:Ce to be 18 percent of their maximum values 80 microseconds after cessation of excitation, although these phosphors have initial decay times between 30 and 70 nsec. Ropp (J. Electrochem. Soc. 115, 531, 1968) has reported the decay time of the standard P-16 phosphor ($Ca_2MgSi_2O_7$:Ce) to be 115 nsec, which is long enough to render it unsuitable for flying spot scanners (the emission of this phosphor is also yellowish-green); and Lehman and Ryan (J. Electrochem. Soc. 119, 275, 1972) found CaS:Ce to have an afterglow lasting several milliseconds.

Moreover, the art recognizes that cerium does not always act as an activator. Thus, Royce reported at the May 1968 Meeting of the Electrochemical Society, Extended Abstract No. 34, that incorporation of cerium into yttrium, neodymium, samarium, gadolinium, dysprosium, and erbium oxysulfides resulted in nonluminescent material, whereas certain other rare earth elements were effective activators in yttrium, lanthanum, gadolinium and lutetium oxysulfides, the more effective being samarium, europium and terbium. Applicants have similarly attempted to activate yttrium, lanthanum and gadolinium oxysulfides with cerium. In all cases, the normally white oxysulfide powder is strongly colored yellow by the presence of cerium and is nonluminescent. Yet, when cerium-activated oxyhalides were produced, they unexpectedly exhibited a white color.

It is thus not obvious from the prior art and entirely unexpected that activation by cerium alone of a lanthanum, gadolinium, or yttrium oxychloride or oxybromide would yield a phosphor of exceptional brightness, and having a very short decay time without afterglow.

Phosphors with very short luminescent decay times are especially useful as scintillators and in flying spot scanners. Decay times of scintillators less than $5 \times 10^{-8}$ seconds permit discrimination of individual photon absorption events. Thus, a phosphor which combines a very short decay time with high neutron absorption coefficient and high energy conversion efficiency would permit discrimination between individual neutrons incident on a neutron screen incorporating such phosphor. Unfortunately, all previously known cerium-activated phosphors which have very short decay times also have relatively low energy conversion efficiencies.

It is thus evident that cerium does not always confer luminescence on a host material for which luminescence with other rare earth activators has been demonstrated, that very short decay times with little or no afterglow are not necessarily characteristic of cerium activation, nor is a blue to near-ultraviolet emission always associated with cerium activation.

An important object of the invention is to provide an improved oxybromide phosphor having stable luminescent properties when exposed to room air or electron excitation, and having essentially the same high energy conversion efficiency as initially exhibited by the unstable oxybromide phosphor.

SUMMARY OF THE INVENTION

Briefly, in accordance with the invention, it has been discovered that particular oxyhalide phosphors exhibit new and unobvious properties making them uniquely suitable for use in phosphor screens for converting image carrying incident radiation to image carrying visible or near-visible radiation. The phosphors have the composition LnOX:Ce where Ln is at least one rare earth host metal ion selected from the group consisting of yttrium, lanthanum and gadolinium, X is at least one halide selected from the group consisting of chlorine and bromine and in which from about 0.001 percent to 10 percent of the host metal ions have been replaced by trivalent cerium ions. Superior performance of the phosphor screens is evidenced by cerium concentrations between about 0.005 percent to 5 percent, with the optimum cerium concentration being about 0.25 percent.

It has been further discovered that the susceptibility of the oxybromide of the invention to reaction with water vapor can be eliminated by converting the outer portion of the oxybromide phosphor particle to the oxychloride phosphors of the invention. This results in a stabilized oxybromide phosphor characterized by having a thin, continuous surface layer of oxychloride on the surface of the oxybromide particle which protects the underlying oxybromide from degradation by atmospheric moisture. The stabilized oxybromide phosphor exhibits substantially the same exceptionally high energy conversion efficiency as that initially exhibited by the undegraded oxybromide.

It has been additionally discovered that the aforementioned technique for stabilizing the oxybromide phosphors of the invention is also useful for stabilizing other oxybromide phosphors having the empirical formula LnOBr:A where Ln is at least one rare earth host metal ion selected from the group consisting of yttrium, lanthanum and gadolinium and A is any element acting as a luminescent activator and in particular at least one trivalent lanthanide ion selected from the group having atomic numbers from 59 through 70 and in which from about 0.001 to 10 percent of the trivalent host metal ions have been replaced by said luminescent ions. A preferred luminescent activator ion concentration is between about 0.005 to 5 percent. Here, the continuous surface layer has the composition LnOCl:A. Various unstabilized oxybromide phosphors known to the art are illustratively disclosed in the aforementioned Rabatin patents.

Stabilization of the preceding oxybromide phosphors is also realized by converting the outer portion of the phosphor particle to the oxyfluoride. The stabilized phosphor has the empirical formula LnOBr:A in which from about 0.001 to 10 percent, preferably 0.005 to 5 percent, of the host metal ions have been replaced by the luminescent activator ions. The stabilized phosphor is characterized by having on its surface a thin, continuous layer of a phosphor of the empirical formula LnOF:A.

Conversion screens utilizing the cerium-activated oxybromide and oxychloride compositions of the invention absorb, for example, x-ray photons and produce in their stead radiation principally in the blue and near-ultraviolet region of the spectrum. The combination of high x-ray absorption coefficient, high x-ray to light energy conversion efficiency, blue to near-ultraviolet emission and very short decay time is unique as compared to other state-of-the-art materials and screens.

The screens of the invention may be freestanding as in fluoroscopic screens, mounted in a cassette and placed in direct contact with x-ray or photographic film as in intensifying screens, or supported in such a way as to allow the light produced to generate photoelectrons from a photocathode, these photoelectrons then being accelerated and reimaged onto a light producing output screen as in x-ray image intensifier tubes. The high cathodoluminescent efficiency of the materials and fast decay time also make them valuable as the light emitting material of cathode ray tubes and flying spot scanner tubes.

The screens of the invention are particularly suited for use in the x-ray range which extends from about 5 Kev to 150 Kev. However, in combination with a metallic layer or sheet selected from the group having atomic numbers in the range of 46 to 83, as described by de Belder, et al. in U.S. Pat. No. 3,872,309, they are also particularly suited for use when x-rays of energy about 150 Kev, the commonly known high energy gamma rays, are used in the radiographic process. Preferably, the metallic layer or sheet is tantalum, tungsten, rhenium, iridium, platinum or lead. Such metal-phosphor screens utilizing the composition of the invention as the phosphor have been found especially valuable for real-time imaging with x-rays having energy as high as 30 MeV. The very fast decay time of the screens of the invention in combination with the very high energy conversion efficiency is uniquely valuable under those conditions where motion of the object to be visualized cannot be avoided since the usual blurring of images due to prolonged decay or afterglow is absent.

When used as a scintillation detector, the composition of the invention is also especially valuable because the very fast decay time in combination with the very high energy conversion efficiency permits resolution of individual photon absorption events spaced closely in time.

BRIEF DESCRIPTION OF THE DRAWING

The invention may be more easily understood from the following description and accompanying drawing in which.

DESCRIPTION OF THE PREFERRED EMBODIMENTS

Figure 1A:
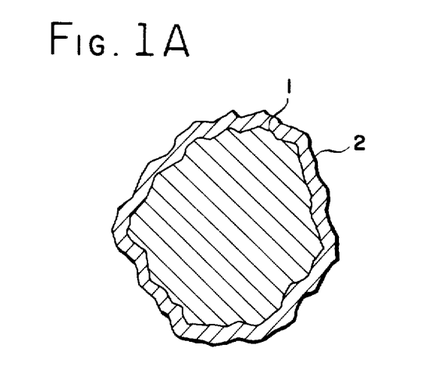
FIG. 1A is a cross-sectional view of a phosphor particle corresponding to the compositions of the invention and the particle diameter is of the order of one to several micrometers.

Referring more particularly to FIG. 1A, there is shown a phosphor particle (1) of the invention having the composition LnOX:Ce where Ln is at least one rare earth host metal ion selected from the group consisting of yttrium, lanthanum and gadolinium, X is at least one halide selected from the group consisting of chlorine and bromine and in which from about 0.001 percent to 10 percent of the host metal ions have been replaced by trivalent cerium ions.

Figure 2:
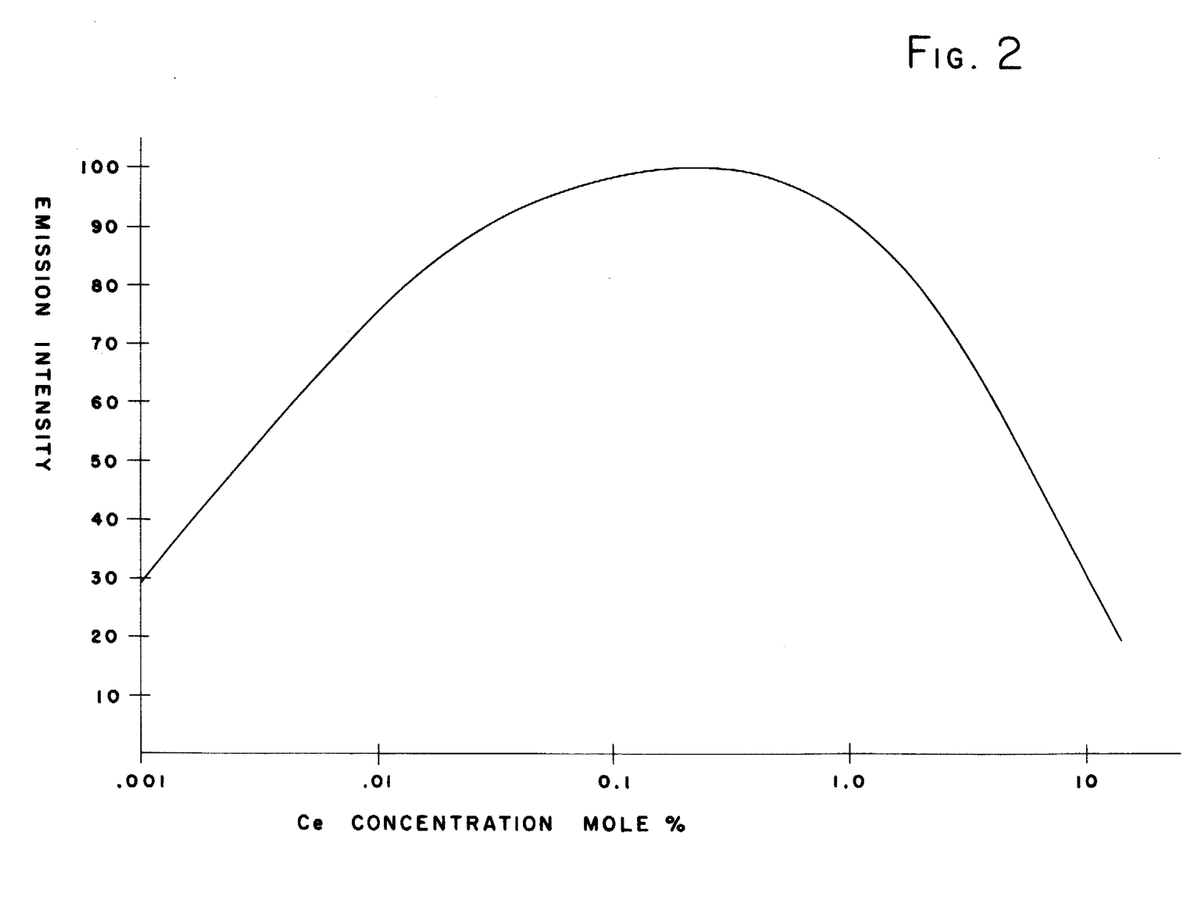
FIG. 2, on coordinates of relative cathodoluminescent emission intensity and cerium concentration, is a semi-logarithmic plot showing the cathodoluminescent brightness of cerium-activated gadolinium oxychloride as a function of the cerium content of the phosphor.

In one embodiment of the invention the oxybromide phosphor of the invention is stabilized by forming a continuous layer (2) of an oxychloride phosphor of the invention on the surface of the oxybromide phosphor. In another embodiment of the invention, layer (2) which stabilizes the oxybromide phosphor, is an oxyfluoride phosphor of the composition LnOF:Ce in which from about 0.001 percent to 10 percent of the host metal ions have been replaced by trivalent cerium ions. FIG. 2 shows the relative brightness of one illustrative phosphor of the invention, gadolinium oxychloride, as a function of cerium concentration. The data was obtained using the cathodoluminescent emission as measured with a photomultiplier containing a gallium arsenide photocathode. As shown, a preferred cerium concentration is between about 0.005 percent to 5 percent, with the optimum cerium concentration being about 0.025 percent.

Figure 1B:
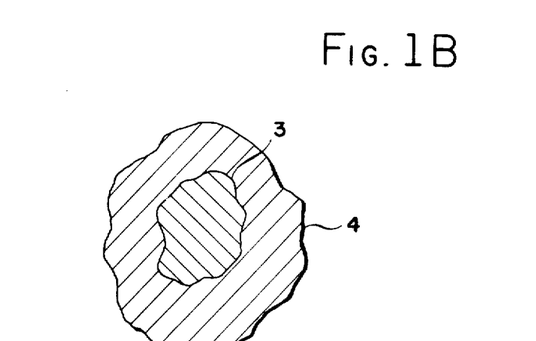
FIG. 1B is a cross-sectional view of another phosphor particle of the invention.

In FIG. 1B there is shown another embodiment of the invention in which phospher particle (3) has the composition LnOBr:A where A is any luminescent activator, in particular at least one trivalent lanthanide ion selected from the group having atomic numbers from 59 through 70 and in which from about 0.001 percent to 10 percent of the trivalent host metal ions have been replaced by said luminescent ions. Phosphor particle (3) is stabilized by forming a continuous layer (4) on its surface, layer (4) being an oxyfluoride of the composition LnOF:A in which from about 0.001 percent to 10 percent of the trivalent host metal ions have been replaced by the luminescent activator ions.

Layers (2) and (4) are provided by the conversion of the outer portion of the oxybromide phosphor particle to the oxychloride or oxyfluoride by treatment with the corresponding hydrogen halide gas or halide compound. During the treatment, the original bromine atoms of the phosphor are exchanged for fluorine or chlorine atoms. The intial exchange occurs at the surface of the particle; under the influence of the concentration gradient thus established, the fluorine or chlorine atoms diffuse toward the interior while the bromine atoms diffuse toward the exterior where they are exchanged for additional fluorine or chlorine atoms, and escape into the surrounding atmosphere as hydrogen bromide or are taken up by the fluoride or chloride compound used in the treatment. By terminating the reaction before a substantial fraction of the oxybromide particle has been converted, the structure of FIGS. 1A and 1B is obtained. The resultant coatings (2) and (4) are thin, continuous layers over cores (1) and (3), respectively, and are integral therewith; that is, the layers (2) and (4) constitute a portion of the same single crystal which also constitutes the core.

As the oxyfluorides and oxychlorides are inert toward water vapor and exhibit no tendency towards degradation under bombardment by an electron beam of typical current density employed in the image converter tubes, cathode ray tubes or other devices in which the phosphor may be utilized, the underlying oxybromide phosphor core is thereby protected from degradation.

It is important that the layer of oxyfluoride or oxychloride be substantially continuous so that none of the oxybromide core extends to the surface. Otherwise, the oxybromide will be susceptible to reaction with water vapor or the degrading effects of an electron beam. The structure of FIGS. 1A and 1B is therefore to be distinguished from that of a particle coated with a layer of much smaller discrete particles by means of a particle adsorptive material as described in U.S. Pat. Nos. 3,275,466 and 3,294,569. It is well known that enhanced diffusion generally occurs along grain boundaries, thus water vapor would have relative ease of access for reaction with the core particle were the layer to consist of discrete small particles, and would not afford the protection afforded by the continuous, integral layer of FIGS. 1A and 1B.

A continuous protective layer could also be provided by evaporation or vapor plating of an inert material such as silica onto the particles. The overall brightness of the particle would be reduced, however, as a result of the diluting effect of the nonluminescent coating. The rare earth oxyfluorides and oxychlorides, on the other hand, are luminescent materials. The preferred stabilizing coating for the oxybromide is the oxychloride which has a brightness approaching that of the oxybromide. The overall brightness of the coated particle, therefore, is not appreciably less than that of the uncoated oxybromide particle. While the brightness of the oxyfluoride coating is less than that of the oxychloride coating, the overall efficiency is still sufficiently high to render a useful result. Typically, coated phosphors exceeding 90 percent of the uncoated efficiency are achieved.

As the compositions of the invention are produced by a diffusion process, there is not a distinct line of demarcation between the coating and the core of the particles of FIGS. 1A and 1B. The coating line of the figure is therefore to be understood as corresponding to the limiting depth, dependent upon the time and temperature of treatment, to which the oxybromide has been completely converted to the oxychloride or oxyfluoride. Extending from this limit toward the interior is a region in which partial conversion has occurred. In the region of partial conversion the composition is that of an oxychloridebromide or oxyfluoridebromide. Under certain conditions this region may extend to the center of the core. It is well known that a partial substitution of a different element for an element of an efficient luminescent compound frequently results in partial or even complete quenching of the luminescence. Thus, if oxygen is partially substituted for some of the sulfur of a luminescent oxysulfide, so that stoichiometry no longer obtains, the luminescence is almost completely quenched. Therefore, it is unexpected that the coated phosphors of the invention would be luminescent and that the oxychloride-oxybromide phosphor would have almost the same high energy conversion efficiency as the stoichiometric oxybromide.

The compositions of the invention may be prepared by any of the several processes listed by P. Pascal (Nouveau Traite de Chimie Minerale, Vol. VII, Part 2, Rare Earths. Masson et Cie, Paris 1959, pp. 764-766). The lanthanide oxychlorides are formed when one heats the hydrated chlorides in air. As employed by Swindells (J. Electrochem. Soc. 101, 415, 1954), the lanthanum oxychloride phosphors activated by antimony, bismuth, samarium, neodynium, and praseodymium were prepared by dissolving lanthanum oxide in an aqueous hydrochloric acid solution; to this was added the trivalent oxide or chloride of the activator. The chlorides solution was then evaporated to dryness, baked and pulverized, followed by prolonged heating in air at 600° C. and a final firing for 1 hour at 1000° C. Although Swindells reported he was unable to obtain activation by Ag, Au, Ce, Cr, Cu, Mn, Pb, Sn, Ti, Tl, or U by this method, we have successfully produced luminescent YOCl:Ce, LaOCl:Ce, GdOCl:Ce, YOCl:Bi, YOCl:Bi,Ce, LaOCl:Tb, LaOCl:Tb,Ce, YOCl:Tb,Ce. In general, the energy conversion efficiency of phosphors prepared in this manner is relatively low, but can be markedly improved by a subsequent treatment in a mixture of hydrogen chloride gas and an inert carrier gas such as argon or nitrogen at a temperature of about 1000° to 1100° C.

Lanthanide oxychlorides may also be prepared by treating the oxides with water and hydrogen chloride vapors at elevated temperatures, as reported by Templeton and Dauben (J. Am. Chem. Soc. 75, 6069, 1953), who measured the crystal lattice parameters for all the rare earth oxychlorides except promethium using materials prepared by this method. The reaction proceeds in accordance with the equation $La_2O_3(s) + 2HCl(g) = 2LaOCl(s) + H_2O(g)$. The addition of water vapor to the hydrogen chloride vapor serves to prevent the formation of the trichloride in the competing reaction $La_2O_3(s) + 6HCl(g) = 2LaCl_3(s) + 3H_2O(g)$. The addition of water vapor is unnecessary if the concentration of the hydrogen chloride is reduced by admixture with an inert gas, as in the gaseous reaction process of Rabatin, U.S. Pat. No. 3,607,770.

The lanthanide oxybromides may be similarly prepared by substitution of hydrogen bromide for the hydrogen chloride of the preceding processes. When the method of Swindells is adapted to preparation of the oxybromides, care must be taken against firing in air at too elevated a temperature, since compounds of the type $Ln_3O_4Br$ are likely to result, as shown by Barnighausen, Brauer and Shultz (Z. anorg. allgem. Chem. 338, 250, 1965).

In the preferred process, a mixed oxide of the rare earth host element and the rare earth activator is first prepared. This is accomplished by dissolving the high purity oxide of the rare earth host element, preferably of 99.99 percent purity or better, and the oxide of the activator, preferably 99.9 percent purity or better, in dilute hydrochloric acid solution, usually 6 N HCl except when terbium activation is desired in which case 3 N HCl is used because terbium oxide is readily soluble in the latter while nearly insoluble in more concentrated solution. The acidic chlorides solution, heated to 55° C., is then added slowly to a 10 percent aqueous solution of oxalic acid, similarly heated to 55° C., while vigorously stirring the latter, as taught by Sobon, U.S. Pat. No. 3,684,730. After addition of the chlorides solution is completed, stirring is continued for 1 or 2 hours while maintaining the temperature of 55° C., to increase the particle size of the precipitate. The precipitate is then filtered, washed with a small amount of water, and dried, after which it is calcined at elevated temperature in an atmosphere of ordinary air, although calcination may also be accomplished in a nitrogen atmosphere which has the advantage of minimizing any tendency of trivalent cerium to oxidize to the tetravalent state; tetravalent cerium is not an activator. After calcination, the oxide mixture is converted to the oxyhalide by the gaseous reaction processes of Templeton and Dauben or of Rabatin, previously referred to. Other methods of preparing rare earth oxyhalides are known to the art and may be employed, but the products have been found to be generally inferior in one or more properties to those prepared by the referenced process.

The oxybromide phosphor thus prepared is next treated, again employing the gaseous reaction process of U.S. Pat. No. 3,607,770 but with the substitution of hydrogen chloride gas for hydrogen bromide gas, so as to convert the exterior portion of the particle to an integral and continuous layer of oxychloride which completely surrounds the oxybromide core of the particle as shown in FIG. 1A. The time and temperature of the hydrogen chloride treatment must be carefully controlled so as not to convert too great a portion of the particle to oxychloride; otherwise, the energy conversion efficiency of the phosphor would be appreciably reduced, the oxychloride having somewhat lower energy conversion efficiency than the oxybromide. It has been found that adequate stability is attained when the exterior oxychloride layer comprises only a small fraction of the mass of the particle. When so prepared, the phosphors exhibit essentially the same brightness as the initial brightness of the starting oxybromide, and the emission spectrum is also indistinguishable from that of the latter. If the hydrogen chloride treatment is sufficiently prolonged, it has been found on the basis of the emission spectrum that the oxybromide particle can be converted completely to the oxychloride.

If desired, a protective layer of oxyfluoride may be produced on the oxybromide particle in place of oxychloride, by substitution of hydrogen fluoride gas for the hydrogen chloride gas. The oxychloride is, however, preferred by reason of somewhat greater luminescent brightness. In addition, the fused silica tube furnaces customarily used in the preparation of phosphors are not corroded by hydrogen chloride gas whereas they may be extensively attached by hydrogen fluoride.

Figures 3, 4, 5, 7:
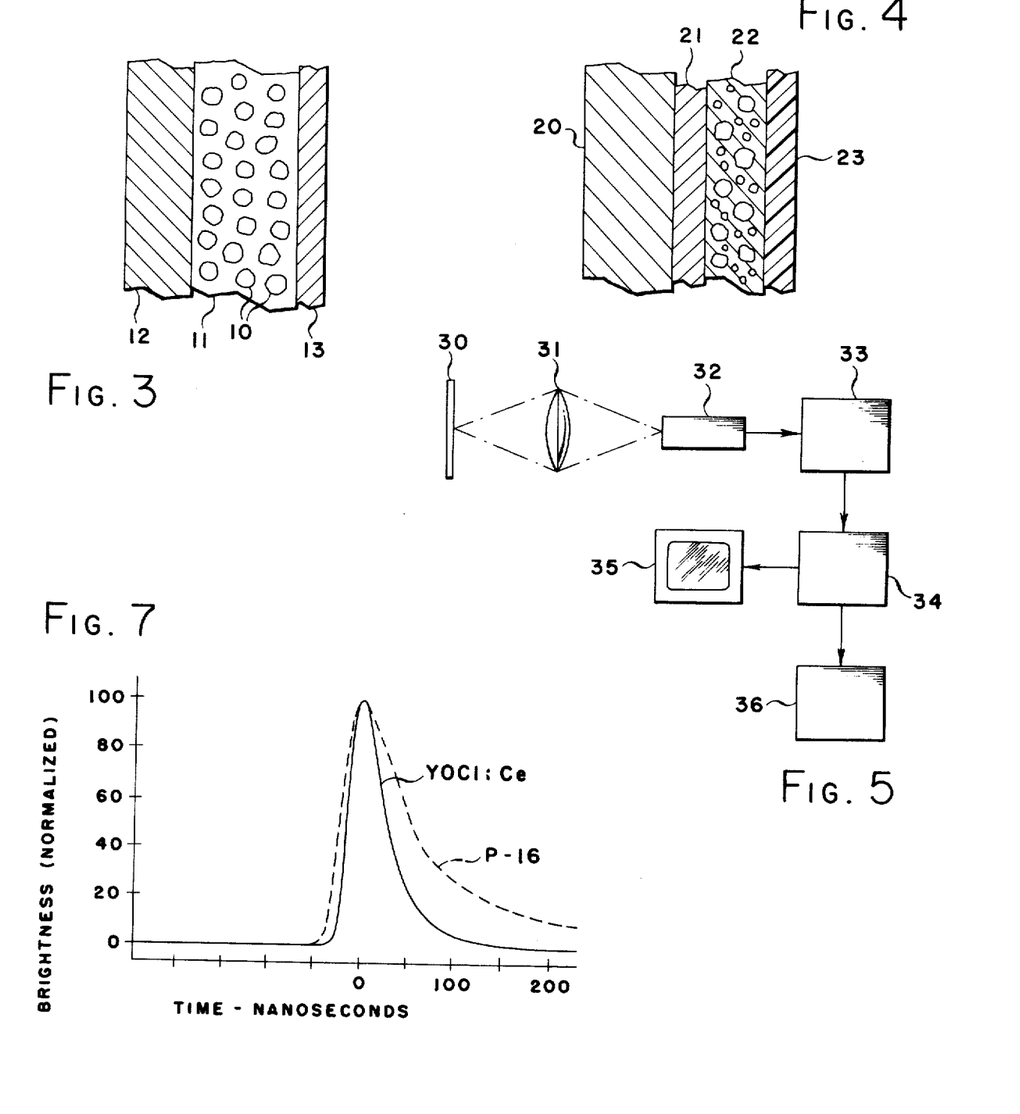
FIG. 3 is a cross-sectional view of a screen utilizing the compositions of the invention.
FIG. 4 is a cross-sectional view of a high energy imaging screen of the invention.
FIG. 5 is a schematic diagram of a high energy, real-time imaging system utilizing a screen of the invention.
FIG. 7, on coordinates of brightness as measured with photomultiplier tube and time, is a plot showing a pair of curves illustrating the luminescent decay of a typical phosphor of the invention and of a prior art P-16 phosphor, $Ca_2MgSi_2O_7:Ce$.

Referring to FIG. 3, there is shown a typical x-ray conversion screen. The phosphor particles (10) are held together by a binder (11). Since the binder also serves as a part of the light transmitting screen, it should be transparent to the emitted radiation and should have an index of refraction matching as closely as possible the index of the phosphor of the invention; otherwise, scattering losses in the screen may become excessive. Typical binders known to the art are plastics, glasses and resins such as those set forth in U.S. Pat. Nos. 3,650,976 and 3,705,858. Other factors affecting the scattering losses are the particle size of the phosphors and the total thickness of the screen. Thickness requirements are usually set by image resolution considerations. Best screen transmission is then typically obtained using particles which are well-formed crystals of a dimension which is a reasonable fraction of the screen thickness. For example, a film intensifier screen having a thickness of 125 microns uses typically phosphor particles of about 10 microns and a fluoroscope screen of 400 microns thickness uses typically phosphor particles of about 40 microns. The screen, consisting of phosphor and binder, is generally formed on a supporting substrate (12) which, depending on the application, can be, for example, plastic, glass or metal. Layer (13) represents a protective film on an intensifying screen, or alternatively, a photocathode is an image intensifier tube. The screen can be either flat or curved, depending on the application. An x-ray image converter tube is shown in more detail in U.S. Pat. No. 3,403,279. The screens of the invention are particularly suited for use in the x-ray range which extends from about 50 Kev to 150 Kev. However, there are applications in the broader range of from about 10 Kev to 250 Kev which can utilize the screens.

An x-ray image intensifier screen was made from GdOBr:Ce prepared in accordance with Example 7 following. More specifically, 25 grams of GdOBr:0.01Ce were added to 10.1 grams of a solution containing 3 parts by volume of xylene and 1 part by volume of cellosolve acetate. To this mixture was added 7.8 grams of a binder solution of an ethyl methacrylate polymer in xylene containing 44 weight percent of the polymer, and the mixture was milled with alumina balls in a glass jar for 1½ hours to disperse the phosphor particles. A 0.010 inch thick coating of the mixture was applied to as 0.010 inch thick Mylar sheet by means of a doctor blade. After evaporation of the solvents, a dried coating thickness of 0.0028 inches was obtained.

Single screens of the GdOBr:Ce (0.0028 in.) and $CaWO_4$ (0.003 in.), each with commercial blue sensitive x-ray film, were placed in cassettes and a timed series of exposures made with 80 $KV_p$ X rays. Table 1 shows the specular optical densities measured on the developed films using an optical densitometer. The GdOBr:Ce screen is shown to be superior to the commercial $CaWO_4$ screen since, for a given exposure time, the GdOBr:Ce screen produces a larger film density.

TABLE 1

| Film Optical Density from 80 $KV_p$, 5Ma X-Ray Source | | |
|---|---|---|
| Exposure | Film Density | |
| (sec.) | $CaWO_4$[b] | GdOBr:Ce[a] |
| 1 | 1.10 | 0.58 |
| 1.5 | 1.45 | 2.78 |
| 2 | 1.68 | 2.87 |
| 3 | 2.07 | 3.05 |
| 4 | 2.28 | (a) |
| 6 | 2.48 | (a) |
| 10 | 2.70 | (a) |
| 15 | 2.84 | (a) |
| 20 | 2.93 | (a) |
| 30 | 3.00 | (a) |

[a] density too great to measure
[b] thickness: 0.0030 in.
[c] thickness: 0.0028 in.

In another embodiment of the invention, the GdOBr:Ce phosphor of the invention is utilized in the form of screens for the detection of neutrons. Such neutron detection screens may be conveniently constructed in the same manner as the x-ray screens previously described. The element gadolinium has an exceptionally large cross section for thermal neutron absorption. Thus, gadolinium reacts with neutrons to produce an (n,γ) reaction product plus an approximately 90 Kev internal conversion electron. These electrons excite emission in the same way as cathode rays and therefore the phosphors of the invention are useful for detecting neutrons with the added advantage that because of the speed of response of the cerium-activated oxyhalide phosphor, they can be used to count neutron events.

The $_{64}Gd^{157}$ isotope has the largest known neutron absorption cross section of any isotope. It is present in naturally occurring gadolinium to an extent of about 16 percent. In addition, the $_{64}Gd^{155}$ isotope, present to the extent of about 15 percent, also has a large neutron absorption cross section, although only about one-fourth as large as that of the first-named isotope (61,000 vs. 254,000 barns). Thus, the GdOBr:Ce phosphor of this invention has important properties as a neutron detector and screens of this phosphor are valuable for neutron radiography. By use of material enriched in $_{64}Gd^{157}$, a neutron screen of exceptional value can be realized.

In another embodiment of the invention, the phosphors of the invention may be utilized as cathodoluminescent screens. Example 1, following, sets forth the cathodoluminescent brightness of one phosphor of the invention, $Gd_{0.99}Ce_{0.01}OBr$. Such screens may be conveniently constructed in the same manner as the x-ray screens previously described with the exception that no binder is required since the phosphor material is formed directly on the substrate, for example, by conventional screen settling techniques.

In FIG. 4 there is shown a typical high energy x-ray screen of the invention. The screen is composed of a metal (20) selected from materials with atomic numbers in the range of 46 to 83 as taught by U.S. Pat. No. 3,872,309. Preferably, the metal is tantalum, tungsten, rhenium, iridium, platinum or lead. The thickness of the metal depends upon the use and MeV energy but a range of thicknesses from about 0.001 inches to 0.10 inches is typically useful for most purposes. Metal (20) may optionally be coated with reflecting layer (21) which is a thin coating of a material of high reflectivity, either specular of diffuse. Typical materials are $TiO_2$ which produce a diffuse reflection layer, and evaporated aluminum or silver, which produces a specular reflectance layer. The purpose of the layer is to reflect visible light generated within a phosphor layer (22) back towards a photographic film or TV camera, situated as shown in the following FIG. 5. Phosphor layer (22) is a cerium-activated oxychloride or oxybromide phosphor of the invention. The layer (22) is composed of a particular phosphor held together and to either reflective layer (21) or metal (20) by a binder. Since the binder also serves as part of the light transmitting screen, it should be transparent to the emitted radiation and should have an index of refraction matching as closely as possible the index of the phosphor of the invention; otherwise, scattering losses in the screen may become excessive. Typical binders are those discussed in conjunction with FIG. 3. A protective layer (23), such as a thin coating of plastic or resin, may optionally be utilized to protect phosphor layer (22) from dirt and abrasion. The depicted screen may be used individually or in pairs. For cassette use, for example, a pair of such screens would be utilized on each side of a photographic film. The screens of the invention are particularly useful in the energy range which extends from about 250 Kev to 25 MeV.

In one embodiment of the invention, a GdOBr:0.01Ce image intensifier screen was prepared in accordance with the x-ray image intensifier screen of FIG. 4. The screen was placed in a real-time viewing chamber containing a low light level TV camera so placed as to view the visible emission from the intensifier screen but well shielded with lead from incident x-rays. The chamber was oriented so that the high energy x-rays from a 7.5 MeV linear accelerator were first incident upon the tungsten. Absorption of the x-rays in the tungsten produced free electrons and lower energy x-rays which in turn excited visible emission from the phosphor material of the screen. Output of the TV camera was viewed on a conventional oscilloscope tube. High quality real-time images were obtained of objects placed between the x-ray source and the viewing chamber.

In FIG. 5 there is shown a schematic diagram of a high energy, real-time imaging system utilizing the screen depicted in FIG. 3. Screen (30) is coupled by optical system (31) onto a TV camera (32). The video signal is amplified in the electronics (33) and enhanced via (34) prior to being either displayed on TV monitor (35) or entered into a computer storage system (36). Optical system (31), which may be composed of lens, mirrors or fiber optics, transfers a portion of the light generated in the screen (30) to the TV camera (32). The usual low level type camera such as the isocon or the image orthocon is the most practical, although other types may be utilized. The TV camera scans the image and converts the visible image into an electronic signal. The video signal is amplified by electronics (33) such as those contained in the commercial TV camera manufactured by Penn Video and optionally enhanced by (34), for example, contrast enhancement, edge enhancement and other image processing techniques known to the art. Such electronic enhancement can be done with either analog or digital circuits. These circuits, for example, might use a Hughes Model 639 scan converter to integrate and enhance the image. The signal is then displayed on TV monitor (35) or entered into a computer storage system (36). Image processing by system (36) can integrate radiation dose to certain parts of the image, control the production process, automatically shut off the radiation source after a predetermined exposure, and perform other functions that are obvious to those skilled in the art. Illustratively, such techniques as image storage on a video tape, disk or electron storage tube could be used to process images and produce improved quality images.

Illustratively, an intensifying screen of the invention is used to convey an x-ray field to visible or near-visible radiation. The image on the intensifying screen is focused by means of an f/0.9 Canon lens onto an isocon RCA Type 4828 tube mounted in a Penn Video commercial TV camera. The TV video signal is stored on a Hughes Model 639 storage tube system and viewed on a TV monitor such as the Conrac Model QQA14/RS. Both high energy x-rays such as those emitted by the Varian Linatron 2000 or low energy x-rays such as those emitted by a standard medical x-ray generator can be used when the appropriate imaging screen is used. Such a system produces visible images on the TV monitor that are useful for inspection and diagnosis of internal functions. An alarm clock placed in the x-ray beam was visualized on the TV screen and motion of the internal parts clearly visualized. Also, using the high energy x-rays, internal parts of a large solid rocket motor were visualized.

Figure 6:
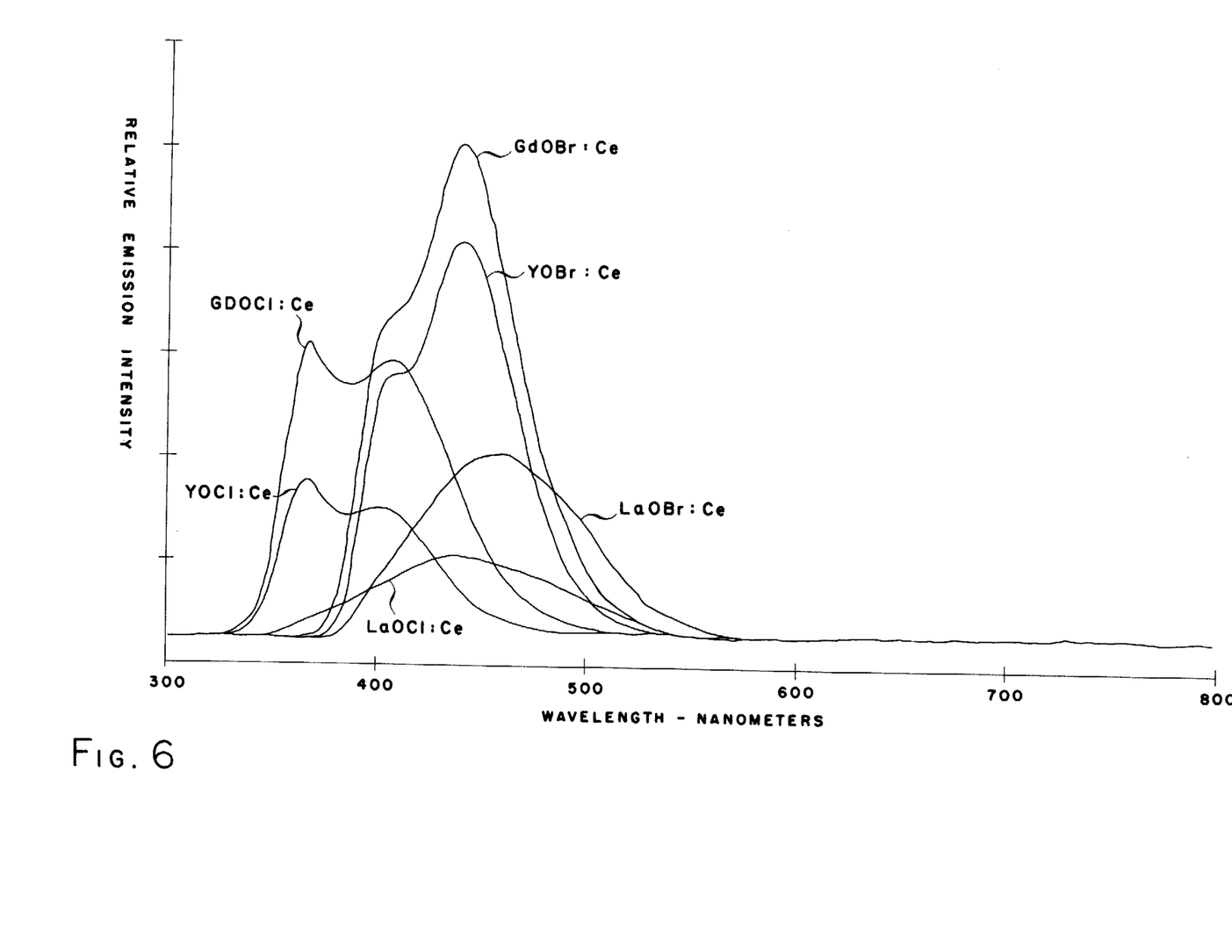
FIG. 6, on coordinates of relative emission intensity and wavelength in nanometer units, is a plot showing the emission spectra of yttrium, lanthanum and gadolinium oxychlorides and oxybromides activated with 1 percent cerium and excited with conventional electron beam excitation apparatus.

In FIG. 6 the relative brightness of the phosphors prepared according to Examples 2 to 7 following may be roughly compared by inspection of the figure, the areas of the curves being approximately proportional to the brightness of each phosphor. The results of more precise measurements of the brightness are shown in Table 2. The brightness measurements were made as follows. Phosphor samples were packed into a recessed metal holder with particular attention being paid to obtaining a smooth surface. The sample holder was mounted in a pivoted mount in an evacuable system provided with a demountable electron gun assembly (an electrostatically-focused oscilloscope gun), viewing ports and provision for introducing high post acceleration voltages at the sample holder. The electron beam was adjusted so as to illuminate a specific area of the sample. The illuminated area was maintained constant for all samples. The emission from the sample was measured with a photomultiplier tube having a gallium arsenide photocathode and an ultraviolet transmitting glass window. A conventional grating spectrometer was used between the sample and the photomultiplier to provide the spectral dispersion. The spectral response of this photomultiplier tube is essentially constant between 300 nanometers and 860 nanometers. The output of the photomultiplier tube was read using an electrometer provided with a digital display. All measurements were made using an electron gun acceleration voltage of 10 Kv and 90 nA beam current. For comparison, measurements were also made on ZnS:Ag (NBS 1020), $La_2O_2S$:Tb, $CaWO_4$:Pb and a P-16 phosphor. The brightness values in Table 2 are expressed relative to that of ZnS:Ag, taken as 100. ZnS:Ag has one of the highest known cathodoluminescent energy conversion efficiencies, an absolute value of 0.204 having been reported by Meyer (J. Electrochem. Soc. 119, 920, 1972). The cathodoluminescent efficiency values of Table 2 were obtained by multiplying the value 0.204 by the relative brightness value and dividing by 100.

The x-ray absorption coefficients of Table 2 have been calculated from the attenuation coefficient for the elements given by W. J. Veigele, X-Ray Cross Section Compilation from 0.1 Kev to 1 MeV, Kaman Sciences Corporation, DNA 2433F, Vol. 1, Revision 1, July 31, 1971.

The high cathodoluminescent energy conversion efficiency of the cerium-activated phosphors of the invention, as shown in Table 2, make them particularly suited as the light emitting screen of cathode ray tubes. The conversion efficiency of GdOBr:Ce approaches closely that of ZnS:Ag which has one of the highest conversion efficiencies of all known phosphors.

TABLE 2

| Phosphor | X-Ray Absorption (cm − 1)[a] | Brightness | Decay Time (Nano sec)[b] | Cathode-ray Efficiency (%)[c] |
|---|---|---|---|---|
| YOCl:.01Ce | 2.9 | 52 | 34 | .106 |
| LaOCl:.01Ce | 9.4 | 4.3 | 100 | .009 |
| GdOCl:.01Ce | 16.0 | 75 | 36 | .153 |
| YOBr:.01Ce | 3.7 | 61 | 65 | .125 |
| LaOBr:.01Ce | 9.8 | 38 | 38 | .078 |
| GdOBr:.01Ce | 14.8 | 89 | 60 | .181 |
| $La_2O_2S$:Tb | 10.9 | 59 | 550,000 | .120 |
| $CaWO_4$:Pb | 17.8 | 23 | 11,000[d] | .047 |
| P-16 | 0.57 | 12 | 80,Nonexp. | 0.24 |
| ZnS:Ag NBS 1020 | 1.63 | 100 | 12,000 | .204 |

[a]X-ray absorption coefficient at 100 Kev.
[b]Time for brightness to decay to 1/e of peak value.
[c]Cathodoluminescent efficiency, calculated from relative brightness assuming 0.204 for ZnS:Ag as reported by V. D. Meyer (J. Electrochem. Soc. 119, 920, 1972).
[d]Value from Am. Inst. Physics Handbook, 3rd Ed., McGraw-Hill, Sec. 9, p. 164.

The decay times of the phosphors prepared according to Examples 2 to 7 are also shown in Table 2. These were measured by applying a signal from a pulse generator to the electron gun in such manner as to illuminate the sample with the electron beam only during the time the signal pulse was present. The signal pulse and the photomultiplier output were simultaneously displayed on an oscilloscope provided with a dual-input preamplifier. The oscilloscope trace was recorded photographically and the decay times determined by measurements on the photographs. It is well known that different phosphors exhibit different types of decay curves. Phosphors having a decay curve which can be represented by the equation $I = I_o e^{-at}$ where $I_o$ is the peak brightness value, I is the brightness value at time t, and a is a rate constant, are known as exponential decay phosphors; the decay time in nanoseconds is the time for the brightness to decrease to $I_o/e$ where e is the base of the natural logarithm system. Other phosphors may have decay curves which can be represented by an equation of the form $I=I_o(1+at)^{-n}$ and are known as hyperbolic or power-law phosphors; these latter phosphors frequently have a pronounced afterglow. Some phosphors have a complex decay curve, the initial portion of which is predominantly exponential, followed by a long-persistent power-law tail. Only the exponential decay phosphors are strictly characterizable by a single decay time constant. For practical purposes, however, it is useful to indicate the time required for the emission of a non-exponential phosphor to fall to 1/e of its peak value and to couple with this a notation of its non-exponential character. Thus, in the table, unless otherwise indicated, the decay is to be understood as exponential.

In FIG. 7 there is shown the cathodoluminescent response and decay of a typical composition of this invention, YOCl:0.01Ce, and also of a typical relatively fast response phosphor known to the art, P-16. The data was obtained using the experimental conditions described above except that the electron beam was pulsed with an acceleration voltage of 10 Kv for a 28 nanosecond pulse duration and 1 pulse per millisecond repetition rate. The measured decay time 34 nanoseconds for YOCl:Ce is typical for the cerium-activated rare earth oxyhalides. The decay is purely logarithmic without afterglow. By contract, the decay for P-16 was found to have an initial nearly exponential decay with a time constant of 80 nanoseconds followed by a persistent non-exponential tail. It is evident from Table 2 that the cerium-activated rare earth oxyhalide phosphors have decay times significantly less than 100 nanoseconds without afterglow, whereas ZnS:Ag, La$_2$O$_2$S:Tb and CaWO$_4$:Pb have very much longer decay times.

Phosphors having high energy conversion efficiency and fast decay are of particular value for flying spot scanning devices. As shown in Table 2, the materials of this invention have a very high cathodoluminescent energy conversion efficiency and a very fast decay. A preferred embodiment of this invention is therefore the use of these materials as the light emitting material of flying spot scanner tubes.

The emission spectra of the materials of this invention when excited by X rays has been found to be indentical to the cathodoluminescent spectra of FIG. 6. The peak emission occurs in the blue to near-ultraviolet and thus provides an excellent match with the blue sensitive photocathode materials. It is well known that thermionic emission of photocathode materials is lower for those having their peak response in the blue than for those having peak response at longer wavelengths. Thermionic emission is a primary source of the dark current which limits the signal to noise ratio of photomultipliers and TV camera tubes. For real time display of x-ray images, the most desirable combination is that of a blue sensitive photocathode and a blue emitting x-ray conversion phosphor. The use of the materials of this invention in combination with photoemissive light detecting devices employing blue sensitive photocathodes for the purpose of real-time viewing of x-ray images thus constitutes an important embodiment of this invention.

Because of their emission characteristics and fast decay times, the phosphors of the invention are obvious useful scintillator materials for detecting and counting particles such as electrons, protons, alphas, neutrons and the like in the same way as ZnS:Ag is used for detecting alpha particles and NaT:Tl and CsI:Tl are used for detecting particles and gamma rays, and thus useful for replacing materials in applications requiring counting of individual events.

Specific examples of devices and compositions of the invention are given below. These examples are to be construed as illustrative only and not limiting in any manner the scope and spirit of the invention as defined by the appended claims.

EXAMPLE 1

A phosphor having the composition Gd$_{0.99}$Ce$_{0.01}$OBr (1 percent replacement of gadolinium by cerium) was prepared by the processes of U.S. Pat. Nos. 3,684,730 and 3,607,770 as modified for the present invention. More specifically, 40 grams Gd$_2$O$_3$ and 9.55 grams CeCl$_3$ were dissolved in 150 ml 6 N HCl heated to 55° C. The chlorides solution was then added slowly to 600 ml of 10 percent oxalic acid aqueous solution maintained at 55° C. and continuously stirred. Following addition of the chlorides solution, stirring was continued at the same 55° C. temperature for an additional 1 hour to increase the particle size of the coprecipitated rare earth oxalates by digestion. The coprecipitate was then separated from the hot solution by filtration, washed with 100 ml of water and then air dried by continuing the suction applied to the filter flask for 1 hour, followed by oven drying at 120° C. overnight. The coprecipitated oxalates, contained in a fused silica boat, were next oxidized by calcining for 2 hours at 110° C. in a nitrogen atmosphere to suppress any tendency of the trivalent cerium to oxidize to the tetravalent state. The mixed oxides, again contained in a fused silica boat and utilizing a fused silica tube furnace, were fired for 1 hour at 1100° C. in a flowing atmosphere at 150 cubic centimeters per minute HBr and 150 cubic centimeters per minute nitrogen, followed by 20 minutes under nitrogen alone. After cooling, microscopic examination revealed GdOBr:Ce single crystal particles having diameters of about 10 microns.

The oxybromide product was divided into several portions; the portions were treated separately at 1200° C. in a flowing atmosphere of 150 cubic centimeters per minute HCl and 150 cubic centimeters per minute nitrogen for the respective times shown in Table 3. After cooling, the cathodoluminescent brightness was measured with an electron gun system of the type conventionally used for such measurements. The measured relative brightnesses of the samples are also shown in Table 3. The emission spectrum of the sample treated for 5 minutes was indistinguishable from that for the untreated oxybromide. The spectra of the samples treated for 12½, 25 and 60 minutes all corresponded to the oxychloride. The brightness of the 60 minute sample agreed closely with that measured for an oxychloride prepared directly from the oxide mixtures, and thus corresponds to complete conversion of the oxybromide to oxychloride. All samples withstood exposure to room air for several months without change, whereas the untreated oxybromide swelled extensively with only a few days exposure. The sample treated for 5 minutes exhibited 95 percent of the original brightness of the untreated oxybromide. A treatment time of 5 minutes is therefore the preferred time since it is sufficient to confer adequate stability with negligible reduction in brightness.

TABLE 3

| Sample No. | HCl Treatment, min. | Relative Brightness |
|---|---|---|
| 1 | None | 100 |
| 2 | 5 | 95 |
| 3 | 12.5 | 93 |
| 4 | 25 | 91 |
| 5 | 60 | 85 |

EXAMPLE 2

A phosphor having the final composition $Y_{0.99}Ce_{0.01}OCl$ (1 percent replacement of yttrium by cerium) was prepared by the processes of U.S. Pat. Nos. 3,684,730 and 3,607,770 as modified for the present invention. More specifically, 25 grams of $Y_2O_3$ and 0.55 grams of $CeCl_3$ were dissolved in 250 ml of 3 N HCl heated to 55° C. The chlorides solution was then added slowly to 540 ml of a 10 percent oxalic acid aqueous solution maintained at 55° C. and continuously stirred. Following addition of the chlorides solution, stirring was continued at the same 55° C. temperature for an additional 30 minutes to increase the particle size of the coprecipitated rare earth oxalates by digestion. The coprecipitate was then separated from the hot solution by filtration, washed with 100 ml of water and then air dried by continuing the suction applied to the filter flask for 1 hour, followed by oven drying at 120° C. overnight. The coprecipitated oxalates, contained in a fused silica boat, were next oxidized by firing in air at 500° C. for 1 hour; oxidation was completed by calcining at 1100° C. in a flowing nitrogen atmosphere for 1 hour. The oxide product was divided into two portions, one portion being reserved for conversion to the oxybromide of Example 5; the other portion was converted to cerium-activated yttrium oxychloride by firing of the mixed oxides for 1½ hours at 1200° C. in a flowing atmosphere of 150 cubic centimeters per minute HCl and 150 cubic centimeters per minute argon, followed by 20 minutes under flowing argon alone. A 2½ inch diameter fused silica tube furnace was used for the calcining and HCl treatment. After cooling, microscopic examination revealed YOCl:Ce single crystal particles having diameters of about 10 microns. A spectrum of this material is shown in FIG. 6.

It will be noted that argon, used as the insert gas for mixing with HCl in the above example, is not one of the inert gases specified in U.S. Pat. No. 3,607,770; the choice of inert gas appears to be relatively immaterial in our experience, the purity of the gas being of greater importance; for critical applications, an ultrapure grade of gas is preferred.

EXAMPLE 3

A phosphor having the final composition $La_{0.99}Ce_{0.01}OCl$ (1 percent replacement of lanthanum by cerium) was prepared by the aforementioned processes of Example 2. More specifically, 24 grams $La_2O_3$ and 0.37 grams $CeCl_3$ were dissolved in 150 ml 3 N HCl heated to 55° C. The chlorides solution was then added to 400 ml of a 10 percent oxalic acid aqueous solution under the same conditions as in Example 2, except that the digestion time to increase particle size was 1 hour. Calcination of the coprecipitated oxalates to the mixed oxides was accomplished in two stages, the first at 500° C. for 1 hour in air and the second at 1000° C. for 2 hours, also in air. The mixed oxide product was divided into two portions, one portion being reserved for conversion to the oxybromide of Example 6; the other portion was converted to LaOCl:Ce under the conditions of Example 2, except that the HCl treatment time was 1 hour 9 minutes and the temperature was 1100° C. A spectrum of the material is shown in FIG. 6.

EXAMPLE 4

A phosphor having the final composition $Gd_{0.99}Ce_{0.01}OCl$ (1 percent replacement of gadolinium by cerium) was prepared by the aforementioned processes of Example 2. More specifically, 40 grams $Gd_2O_3$ and 9.55 grams $CeCl_3$ were dissolved in 150 ml of 6 N HCl and the solution heated to 55° C. as before. The chlorides solution was added to 600 ml of 10 percent oxalic acid aqueous solution, also at 55° C., under the same conditions as in Example 2, with a digestion time of 1 hour. The oxalate coprecipitate, contained in a fused silica boat, was calcined for 2 hours at 1100° C. in a nitrogen atmosphere to suppress any tendency of trivalent cerium to oxidize to the tetravalent state. The mixed oxide product was divided into two portions, one portion being reserved for conversion to the oxybromide of Example 7; the other portion was converted to GdOCl:Ce as in Example 2, using an HCl treatment of 1 hour.

Another series of GdOCl:Ce phosphors containing different concentrations of cerium between 0.01 percent and 10 percent were also prepared as in Example 4. Measurement of the cathodoluminescent brightness showed the optimum cerium concentration to be about 0.25 percent as shown in FIG. 2. A spectrum of this material is shown in FIG. 6.

EXAMPLE 5

A phosphor having the final composition $Y_{0.99}Ce_{0.01}OBr$ (1 percent replacement of yttrium by cerium) was prepared by the aforementioned processes of Example 2, HBr being substituted for HCl and nitrogen for argon. More specifically, the reserved portion of the mixed oxides prepared in Example 2, similarly contained in a fused silica boat, were fired for 1 hour at 1100° C. in a flowing atmosphere of 150 cubic centimeters per minute HBr and 150 cubic centimeters per minute nitrogen, followed by 20 minutes under nitrogen alone. A fused silica tube furnace was utilized as before. A spectrum of this material is shown in FIG. 6.

EXAMPLE 6

A phosphor having the final composition $La_{0.99}Ce_{0.01}OBr$ (1 percent replacement of lanthanum by cerium) was prepared by the aforementioned processes of Example 2, HBr being substituted for HCl and nitrogen for argon. More specifically, the reserved portion of the mixed oxides prepared in Example 3, similarly contained in a fused silica boat, was fired for 1 hour at 1100° C. in a flowing atmosphere of 150 cubic centimeters per minute HBr and 150 cubic centimeters per minute nitrogen, followed by 20 minutes under nitrogen alone. A fused silica tube furnace was utilized as before. A spectrum of this material is shown in FIG. 6.

EXAMPLE 7

A phosphor having the final composition $Gd_{0.99}Ce_{0.01}OBr$ (1 percent replacement of gadolinium by cerium) was prepared by the aforementioned processes of Example 2, HBr being substituted for HCl and nitrogen for argon. More specifically, the reserved portion of the mixed oxides prepared in Example 4, similarly contained in a fused silica boat and utilizing a fused silica tube furnace, were fired for 1 hour at 1100° C. in a flowing atmosphere of 150 cubic centimeters per minute HBr and 150 cubic centimeters per minute nitrogen, followed by 20 minutes under nitrogen alone. A spectrum of this material is shown in FIG. 6.

What is claimed is:

1. A stabilized rare earth oxybromide phosphor consisting essentially of at least one oxybromide selected from the group consisting of yttrium oxybromide, lanthanum oxybromide and gadolinium oxybromide in which from about 0.001 percent to about 10 percent of the host metal ions have been replaced by trivalent cerium ions and characterized by having an integral, continuous surface layer of at least one rare earth oxychloride selected from the group consisting of yttrium oxychloride, lanthanum oxychloride and gadolinium oxychloride in which from about 0.001 percent to about 10 percent of the host metal ions have been replaced by trivalent cerium ions.

2. A rare earth phosphor is accordance with claim 1, wherein from about 0.005 percent to about 5 percent of said host metal ions have been replaced by trivalent cerium ions.

3. A rare earth phosphor in accordance with claim 1, wherein said oxybromide is yttrium oxybromide and said surface layer is yttrium oxychloride.

4. A rare earth phosphor in accordance with claim 1, wherein said oxybromide is lanthanum oxybromide and said surface layer is lanthanum oxychloride.

5. A rare earth phosphor in accordance with claim 1, wherein said oxybromide in gadolinium oxybromide and said surface layer is gadolinium oxychloride.

6. A stabilized rare earth oxybromide phosphor having the empirical formula:

$$LnOBr:A$$

where Ln is at least one rare earth host metal ion selected from the group consisting of yttrium, lanthanum and gadolinium, A is a luminescent activator and in which from about 0.001 percent to about 10 percent of the trivalent host metal ions have been replaced by said luminescent ions and characterized by having an integral surface layer having the empirical formula:

$$LnOCl:A$$

in which from about 0.001 percent to about 10 percent of the trivalent host metal ions have been replaced by said luminescent ions.

7. A stabilized rare earth oxybromide phosphor in accordance with claim 6, wherein said luminescent ion A is at least one lanthanide ion selected from the group having atomic numbers from 59 through 70.

8. A stabilized rare earth oxybromide phosphor in accordance with claim 7, wherein from about 0.005 percent to about 5 percent of said host metal ions have been replaced by at least one said lanthanide ion.

9. A stabilized rare earth phosphor consisting essentially of at least one oxybromide selected from the group consisting of yttrium oxybromide, lanthanum oxybromide and gadolinium oxybromide in which from about 0.001 percent to about 10 percent of the host metal ions have been replaced by trivalent cerium ions and characterized by having an integral, continuous surface layer of at least one rare earth oxyfluoride selected from the group consisting of yttrium oxyfluoride, lanthanum oxyfluoride and gadolinium oxyfluoride in which from about 0.001 percent to about 10 percent of the host metal ions have been replaced by trivalent cerium ions.

10. A rare earth phosphor in accordance with claim 9, wherein from about 0.005 percent to about 5 percent of said host metal ions have been replaced by trivalent cerium ions.

11. A stabilized rare earth oxybromide phosphor having the empirical formula:

$$LnOBr:A$$

where Ln is at least one rare earth host metal ion selected from the group consisting of yttrium, lanthanum and gadolinium, A is a luminescent activator and in which from about 0.001 percent to about 10 percent of the trivalent host metal ions have been replaced by said luminescent ions and characterized by having an integral surface layer having the empirical formula:

$$LnOF:A$$

in which from about 0.001 percent to about 10 percent of said trivalent host metal ions have been replaced by said luminescent ions.

12. A rare earth phosphor in accordance with claim 11, wherein said trivalent luminescent ion A is at least one lanthanide ion selected from the group having atomic numbers from 59 through 70.

13. A rare earth phosphor in accordance with claim 12, wherein from about 0.005 percent to about 5 percent of said host metal ions have been replaced by at least one said lanthanide ion.

14. A conversion screen for converting an image carrying energy field into image carrying visible or near-visible energy consisting essentially of a rare earth phosphor and a substrate for said phosphor, said phosphor having the empirical formula:

$$LnOBr:Ce$$

where Ln is at least one rare earth host metal ion selected from the group consisting of yttrium, lanthanum and gadolinium in which from about 0.001 percent to 10 percent of the host metal ions have been replaced by trivalent cerium ions and characterized by having an integral surface layer having the empirical formula:

$$LnOB:Ce$$

where B is at least one oxyhalide selected from the group consisting of chlorine and fluorine and in which from about 0.001 percent to 10 percent of the host metal ions have been replaced by said cerium ions.

15. A conversion screen in accordance with claim 14, wherein said oxyhalide is chlorine.

16. A conversion screen in accordance with claim 14, wherein said oxyhalide is fluorine.

17. A conversion screen in accordance with claim 14, wherein from about 0.005 percent to about 5 percent of said host metal ions have been replaced by said cerium ions.

18. A combination metal and phosphor imaging screen for converting high energy radiation to visible or near-visible radiation, said phosphor having the empirical formula:

$$LnOBr:Ce$$

where Ln is at least one rare earth host metal ion selected from the group consisting of yttrium, lanthanum and gadolinium in which from about 0.001 percent to about 10 percent of the host metal ions have been replaced by trivalent cerium ions and said metal being selected from those metals which fall within the group of elements having atomic numbers 46 through 83, and characterized by having an integral surface layer having the empirical formula:

LnOB:Ce where B is at least one oxyhalide selected from the group consisting of chlorine and fluorine and in which from about 0.001 percent to 10 percent of the host metal ions have been replaced by said cerium ions.

19. A combination metal-phosphor screen in accordance with claim 18, wherein said oxyhalide is chlorine.

20. A combination metal-phosphor screen in accordance with claim 19 wherein said oxyhalide is fluorine.

21. A combination metal-phosphor screen in accordance with claim 19, wherein from about 0.005 percent to about 5 percent of said host metal ions have been replaced by said cerium ions.

22. A combination metal-phosphor screen in accordance with claim 18 wherein said metal is selected from the group consisting of tantalum, tungsten, rhenium, iridium, platinum and lead.

23. A method of translating an image carrying field into radiation principally in the blue and near-ultraviolet region of the spectrum comprising the steps of positioning in said energy field a phosphor and irradiating said phosphor with said energy field, thereby to convert said energy into said blue and near-ultraviolet radiation, said phosphor having the empirical formula:

LnOBr:Ce when Ln is at least one rare earth host metal ion selected from the group consisting of yttrium, lanthanum and gadolinium in which from about 0.001 percent to about 10 percent of the host metal ions have been replaced by trivalent cerium ions and characterized by having an integral surface layer having the empirical formula:

LnOB:Ce where B is at least one oxyhalide selected from the group consisting of chloride and fluorine and in which from about 0.001 percent to about 10 percent of the host metal ions have been replaced by said cerium ions.

24. A method in accordance with claim 23, wherein said oxyhalide is chlorine.

25. A method in accordance with claim 23, wherein said oxyhalide is fluorine.

26. A method in accordance with claim 23, wherein from about 0.005 percent to about 5 percent of said host metal ions have been replaced by said cerium ions.

27. A method of translating an image carrying high energy field into radiation principally in the blue and near-ultraviolet region of the spectrum comprising the steps of positioning in said energy field a combination metal and phosphor imaging screen and irradiating said screen with said high energy field, thereby to convert said energy into said blue and near-ultraviolet radiation, said phosphor having the empirical formula:

LnOBr:Ce where Ln is at least one rare earth host metal ion selected from the group consisting of yttrium, lanthanum and gadolinium in which from about 0.001 percent to about 10 percent of the host metal ions have been replaced by trivalent cerium ions and said metal is a metal selected from the group consisting of metals having atomic numbers 46 through 83 and characterized by having an integral surface layer having the empirical formula:

LnOB:Ce where B is at least one oxyhalide selected from the group consisting of chlorine and fluorine and in which from about 0.001 percent to about 10 percent of the host metal ions have been replaced by said cerium ions.

28. A method in accordance with claim 27, wherein said oxyhalide is chlorine.

29. A method in accordance with claim 27, wherein said oxyhalide is fluorine.

30. A method in accordance with claim 29, wherein from about 0.005 percent to about 5 percent of the host metal ions have been replaced by said cerium ions.

31. A method in accordance with claim 27, wherein said blue and near-ultraviolet radiation is detected and converted into a video signal by a TV camera and said signal is displayed on a TV monitor.

32. A method in accordance with claim 31, wherein said video signal is processed by a computer system.

33. A method in accordance with claim 27 wherein said metal is selected from the group consisting of tantalum, tungsten, rhenium, iridium, platinum and lead.

* * * * *